US008640817B2

(12) United States Patent
Williams

(10) Patent No.: US 8,640,817 B2
(45) Date of Patent: Feb. 4, 2014

(54) STEERING APPARATUS FOR TURNING MULTIPLE SETS OF STEERABLE VEHICLE WHEELS

(75) Inventor: Daniel E. Williams, Lebanon, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 211 days.

(21) Appl. No.: 13/159,520

(22) Filed: Jun. 14, 2011

(65) Prior Publication Data

US 2012/0318603 A1 Dec. 20, 2012

(51) Int. Cl.
*B62D 5/04* (2006.01)

(52) U.S. Cl.
USPC .......... 180/446

(58) Field of Classification Search
USPC ......... 180/445, 443, 446, 402, 407, 408, 411, 180/12, 413
See application file for complete search history.

(56) References Cited

U.S. PATENT DOCUMENTS 4,758,012 A * 7/1988 Ogura et al. .................. 180/409
5,096,011 A * 3/1992 Oslapas ........................ 180/412
6,397,970 B1 6/2002 Williams
6,546,322 B2 * 4/2003 Williams ........................ 701/41
6,945,350 B2 * 9/2005 Szabela et al. ................ 180/411
8,069,945 B2 * 12/2011 Sherwin ........................ 180/402
2007/0144818 A1 * 6/2007 Sherwin ........................ 180/411
2008/0289897 A1 * 11/2008 Williams ...................... 180/402
2010/0051375 A1 * 3/2010 Sherwin ........................ 180/411

* cited by examiner

*Primary Examiner* — Tashiana Adams
(74) *Attorney, Agent, or Firm* — Tarolli, Sundheim, Covell & Tummino LLP

(57) ABSTRACT

A steering apparatus (10) responsive to rotation of a handwheel (40) for turning steerable wheels (14, 16) includes a first steering gear (22) actuatable to affect turning of a first set (14) of steerable wheels (14*a*, 14*b*) and a second steering gear (24) actuatable to affect turning of a second set (16) of steerable wheels (16*a*, 16*b*). A torque transmission device (70) includes an input member (72) connected to the handwheel (40). A first output member (82) is mechanically coupled to the input member (72) and connected to the first steering gear (22) for actuating the first steering gear (22). A second output member (92) is mechanically coupled to the input member (72) and connected to the second steering gear (24) for actuating the second steering gear (24). A sensor (58) senses at least one condition of the handwheel (40) and provides a steering signal to a controller (62) that receives the steering signal and controls rotation of the input member (72) of the torque transmission device (70) for controlling actuation of the first and second steering gears (22, 24).

17 Claims, 3 Drawing Sheets

STEERING APPARATUS FOR TURNING MULTIPLE SETS OF STEERABLE VEHICLE WHEELS

TECHNICAL FIELD

The present invention relates to a vehicle steering apparatus and, in particular, relates to a vehicle steering apparatus for turning first and second sets of steerable vehicle wheels.

BACKGROUND OF THE INVENTION

Vehicle steering systems for turning more than one set of steerable vehicle wheels are known. Typically, such a steering system is adapted to turn a front set and a rear set of vehicle wheels in response to rotation of a vehicle handwheel. Current connections between the handwheel and the sets of steerable wheels are cumbersome and complicated and thereby provide poor steering quality. There is therefore a need to provide a steering system for multiple sets of steerable wheels that provides improved steering quality.

SUMMARY OF THE INVENTION

The present invention relates to a steering apparatus that is responsive to rotation of a handwheel for turning steerable wheels of a vehicle having first and second sets of steerable wheels. The steering apparatus includes a first steering gear actuatable to affect turning of a first set of steerable wheels in response to rotation of the handwheel. A second steering gear is actuatable to affect turning of a second set of steerable wheels in response to rotation of the handwheel. A torque transmission device includes an input member connected to the handwheel and rotatable in response to rotation of the handwheel. A first output member is mechanically coupled to the input member and connected to the first steering gear for actuating the first steering gear. A second output member is mechanically coupled to the input member and connected to the second steering gear for actuating the second steering gear. A sensor senses at least one condition of the handwheel and provides a steering signal indicative of the at least one sensed handwheel condition. A controller receives the steering signal and, in response to the steering signal, controls rotation of the input member of the torque transmission device for controlling actuation of the first and second steering gears.

In another aspect of the present invention, a steering apparatus that is responsive to rotation of a handwheel for turning steerable wheels of a vehicle has first and second sets of steerable wheels. The steering apparatus includes a first steering gear actuatable to affect turning of a first set of steerable wheels in response to rotation of the handwheel. A second steering gear is actuatable to affect turning of a second set of steerable wheels in response to rotation of the handwheel. A torque transmission device includes an input member connected to the handwheel and rotatable in response to rotation of the handwheel. A first output member is mechanically coupled to the input member and connected to the first steering gear for actuating the first steering gear. A second output member is mechanically coupled to the input member and connected to the second steering gear for actuating the second steering gear. A sensor senses at least one condition of the handwheel and provides a steering signal indicative of the at least one sensed handwheel condition. A controller receives the steering signal and, in response to the steering signal, provides feedback to the handwheel.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
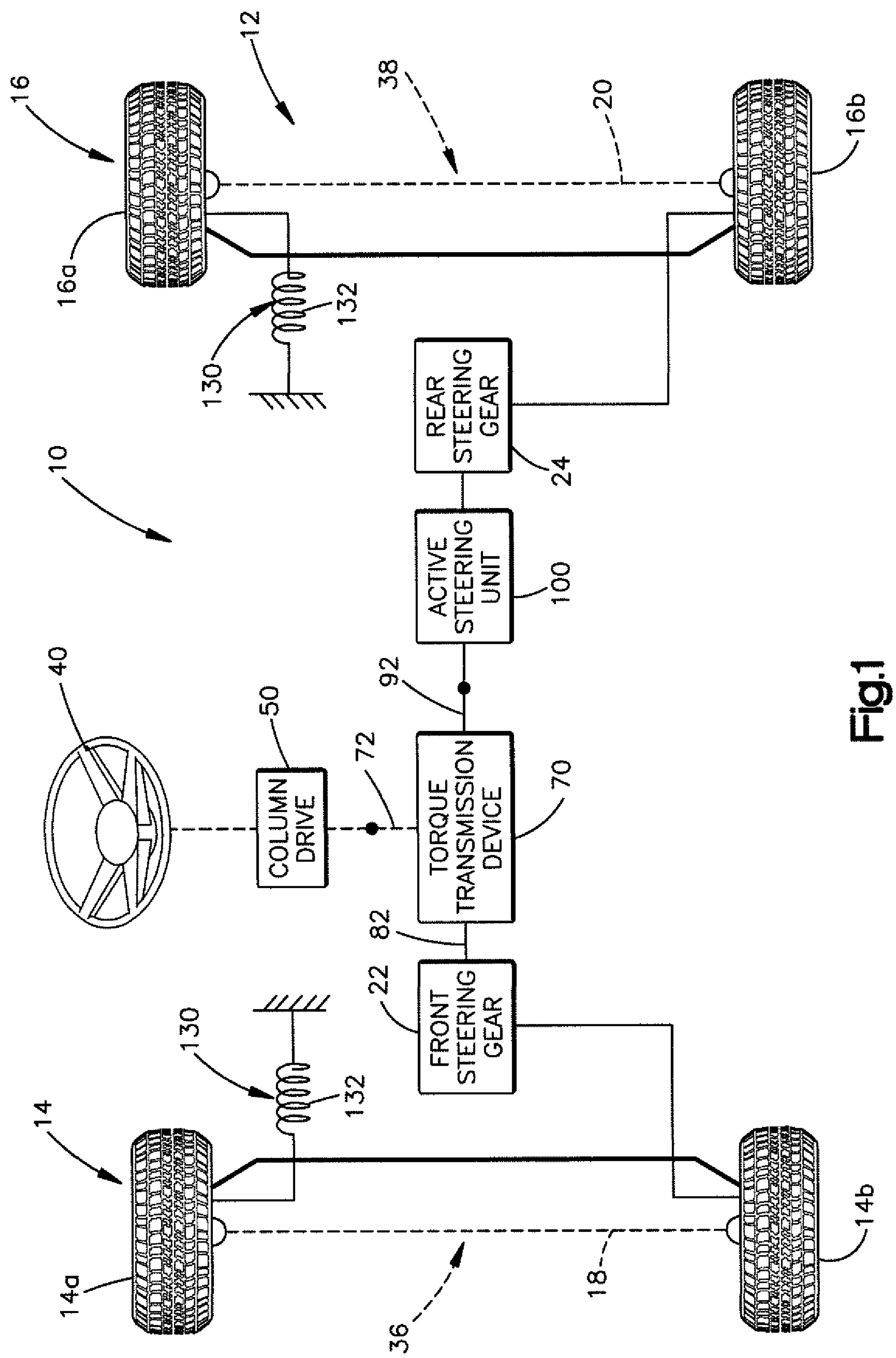
FIG. 1 is a schematic block diagram illustrating a steering apparatus constructed in accordance with the present invention.

The present invention relates to a vehicle steering apparatus and, in particular, relates to a vehicle steering apparatus for turning first and second sets of steerable vehicle wheels. FIG. 1 is a schematic block diagram illustrating a steering apparatus 10 constructed in accordance with the present invention. The steering apparatus 10 is mounted to a vehicle 12 that has a front set 14 of steerable wheels and a rear set 16 of steerable wheels. The front set 14 of steerable wheels includes wheels 14*a* and 14*b* and the rear set 16 of steerable wheels includes wheels 16*a* and 16*b*. The wheels 14*a* and 14*b* are mounted on opposite ends of a front axle 18 and the wheels 16*a* and 16*b* are mounted on opposite ends of a rear axle 20.

The steering apparatus 10 includes a front steering gear 22 and a rear steering gear 24. The front steering gear 22 and the rear steering gear 24 may be integral steering gears. An exemplary integral steering gear that may be used for the front steering gear 22 and/or the rear steering gear 24 is described in U.S. Pat. No. 6,945,350, which is incorporated by reference herein in its entirety.

A steering linkage, shown schematically at 36, is associated with the front steering gear 22 and includes the front axle 18. A steering linkage, shown schematically at 38, is associated with the rear steering gear 24 and includes the rear axle 20. When the front steering gear 22 or rear steering gear 24 is actuated, the associated steering linkage 36 or 38 is operated and the steerable wheels 14*a*, 14*b* or 16*a*, 16*b* associated with the axle 18 or 20 are turned.

As shown in FIG. 1, the front steering gear 22 and the rear steering gear 24 are actuatable in response to rotation of a vehicle handwheel 40 to affect turning of the front set 14 and the rear set 16 of steerable wheels 14*a*, 14*b* and 16*a*, 16*b*, respectively. The front steering gear 22 and the rear steering gear 24 are operatively connected to the vehicle handwheel 40 via a torque transmission device 70 such that rotation of the handwheel causes actuation of both the front and rear steering gears.

A column drive 50 is provided between the handwheel 40 and the torque transmission device 70 (FIG. 1). The column drive 50 includes an electric motor 52 connected to the handwheel 40 and operated by a controller 62 based on sensed vehicle conditions (see FIG. 3) such that the column drive provides feedback or steering feel to the handwheel. The electric motor 52 of the column drive 50 also adjusts the torque applied to the torque transmission device 70 to provide steering assist in actuating the front and rear steering gears 22, 24. An exemplary column drive 50 that may be used in the present invention is described in U.S. Pat. No. 6,546,322, which is incorporated by reference herein in its entirety.

The steering apparatus 10 (FIG. 1) also includes an active steering unit 100 positioned between the torque transmission device 70 and the rear steering gear 24. The active steering unit 100 may be configured to supplement or reduce the torque supplied by the torque transmission device 70 to the rear steering gear 24. The active steering unit 100 thereby allows a different torque to be applied to the rear steering gear 24 than to the front steering gear 22 based on sensed vehicle conditions when a single torque is applied to the handwheel 40.

The steering apparatus 10 may further include an anti-lash unit 130 for one or both sets 14, 16 of steerable wheels 14*a,* 14*b,* 16*a,* 16*b*. The anti-lash units 130 are secured to the steerable wheels 14*a,* 16*a* and help to remove relative movement between components of the steering apparatus 10 as a result of clearance between the components of the steering apparatus. This clearance may be the result of manufacturing tolerances, wear, and/or other causes.

Figure 2:
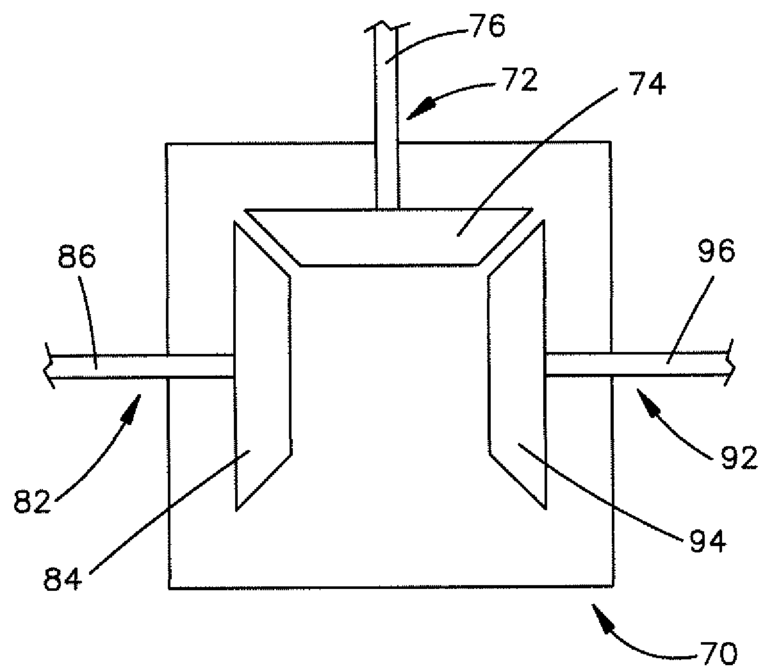
FIG. 2 is a torque transmission device of the steering apparatus of FIG. 1.

As shown in FIG. 2, the torque transmission device 70 is formed as a T-box gear set and includes an input member 72 operatively connected to the vehicle handwheel 40. The input member 72 includes a gear 74, such as a beveled gear, and a shaft 76 that may be directly or indirectly connected (not shown) to an output of the column drive 50. In any case, the input member 72 is mechanically coupled to the handwheel 40 such that rotation of the handwheel results in rotation of the input member.

The input member 72 is mechanically coupled to both a first output member 82 and a second output member 92. Rotation of the input member 72 results in rotation of both the first output member 82 and the second output member 92. The first output member 82 includes a gear 84, such as a beveled gear, that is in meshing engagement with the gear 74 of the input member 72. A shaft 86 extends from the gear 84 and is connected to an input member (not shown) of the front steering gear 22 for actuating the front steering gear. The second output member 92 also includes a gear 94, such as a beveled gear, that is in meshing engagement with the gear 74 of the input member 72. A shaft 96 extends from the gear 94 and is connected to an input member (not shown) of the rear steering gear 24 for actuating the rear steering gear.

The gears 84, 94 of the first and second output members 82, 92, respectively, may have the same configuration such that the gear ratio of the input member 72 to the first output member 82 is the same as the gear ratio of the input member to the second output member 92. Alternatively, the gears 84, 94 may be different from one another such that the gear ratio of the input member 72 to the first output member 82 is greater or less than the gear ratio of the input member to the second output member 92. By varying the gear ratios of the torque transmission device 70, the torque applied to the front steering gear 22 relative to the torque applied to the rear steering gear 24 may be varied. Although FIG. 2 illustrates one configuration for the torque transmission device 70, it will be appreciated that the torque transmission device may exhibit alternative configurations so long as a single torque input is received and multiple torque outputs are delivered.

Figure 3:
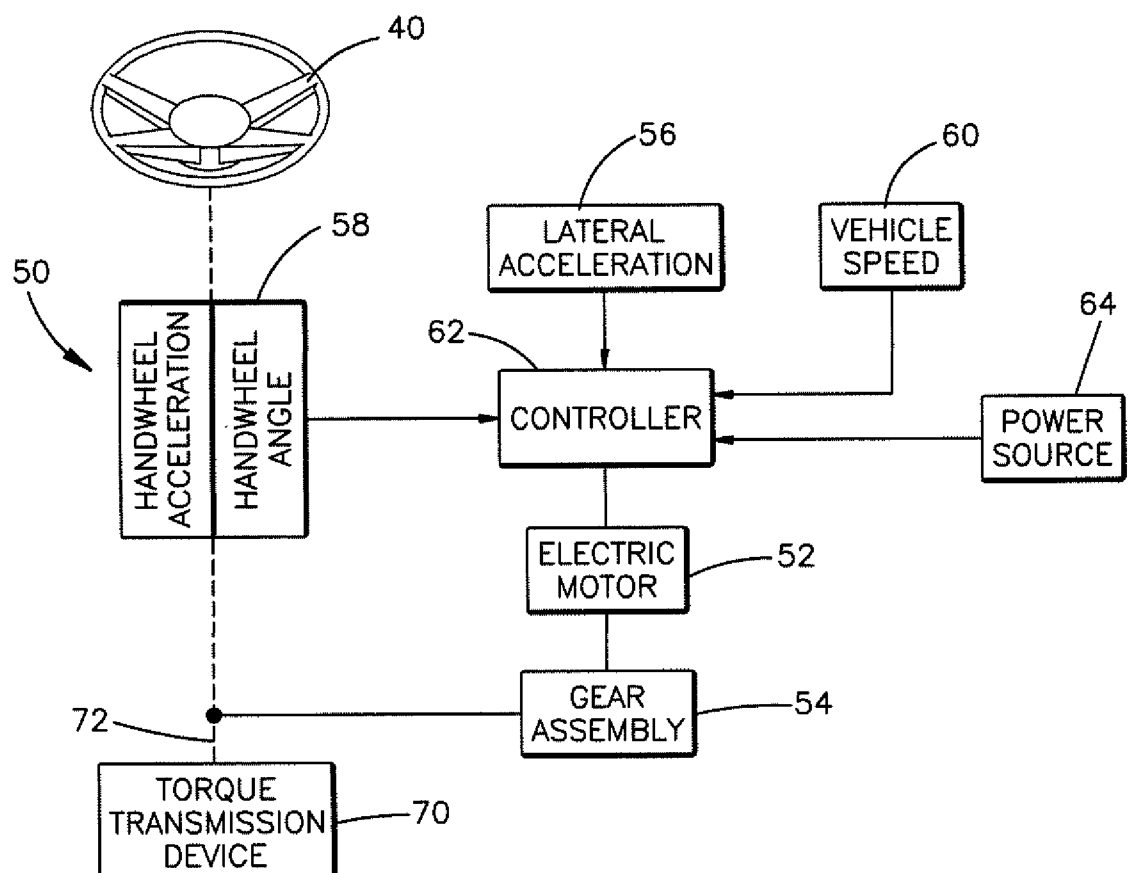
FIG. 3 is a schematic block diagram illustrating a column drive of the steering apparatus of FIG. 1.

As shown in FIG. 3, the column drive 50 includes an electric motor 52 of any conventional design. The electric motor 52 receives electric power from a power source 64, e.g., the vehicle battery. An output shaft (not shown) of the electric motor 52 is connected to the shaft 76 of the input member 72 of the torque transmission device 70. In particular, a gear assembly 54 is used to connect the output shaft of the electric motor 52 to the shaft 76 of the input member 72. When the electric motor 52 is actuated, the output shaft of the electric motor 52 rotates the gear assembly 54 to affect rotation of the input member 72 of the torque transmission device 70. Rotating the input member 72 in this manner supplements or reduces the torque applied to the input member by the handwheel 40 based on sensed vehicle conditions.

The column drive 50 also includes a plurality of vehicle condition sensors 56, 58, and 60 and a controller 62. In particular, the vehicle condition sensors include a lateral acceleration sensor 56, a handwheel rotation sensor 58, and a vehicle speed sensor 60. Each sensor 56, 58, and 60 is electrically connected to the controller 62.

The lateral acceleration sensor 56 continuously senses the lateral acceleration of the vehicle 12 and generates an electrical signal indicative of the sensed lateral acceleration. The handwheel rotation sensor 58 continuously senses the magnitude, rate, and acceleration of rotation of the vehicle handwheel 40 and generates electrical signals indicative of these parameters. The handwheel rotation magnitude is measured as the angle of rotation of the handwheel relative to a straight ahead position of the handwheel 40. Rotation of the handwheel 40 in a first direction may be designated as a positive value and rotation of the handwheel in a second direction, opposite the first direction, may be designated as a negative value. The handwheel rotation sensor 58 or the controller 62 may determine the rate of rotation of the handwheel 40 by taking a time differential of the magnitude and may determine the handwheel acceleration by taking a time differential of the rate of rotation. The vehicle speed sensor 60 continuously senses the vehicle speed and generates an electrical signal indicative of the vehicle speed.

The controller 62 receives the signals generated by the lateral acceleration sensor 56, the handwheel rotation sensor 58, and the vehicle speed sensor 60. The controller 62 analyzes the respective signals and generates a signal for controlling the electric motor 52 in a known manner. More specifically, the controller 62 controls energization, i.e., torque, amount of rotation, and direction of rotation, of the electric motor 52. When the electric motor 52 is actuated by receiving electric power, the output shaft of the electric motor, through the gear assembly 54, applies a rotational force to the input member 72 of the torque transmission device 70. Accordingly, the electric motor 52 also applies a rotational force to the handwheel 40. As a result, the electric motor 52 assists the operator in controlling actuation of the front steering gear 22 and the rear steering gear 24 by adjusting the torque applied to the input member (not shown) of the front steering gear and the input member (not shown) of the rear steering gear. By using the electric motor 52 to help control actuation of the front steering gear 22 and the rear steering gear 24, the column drive 50 provides desired steering assist and results in a desired steering feel to the operator.

Figure 4:
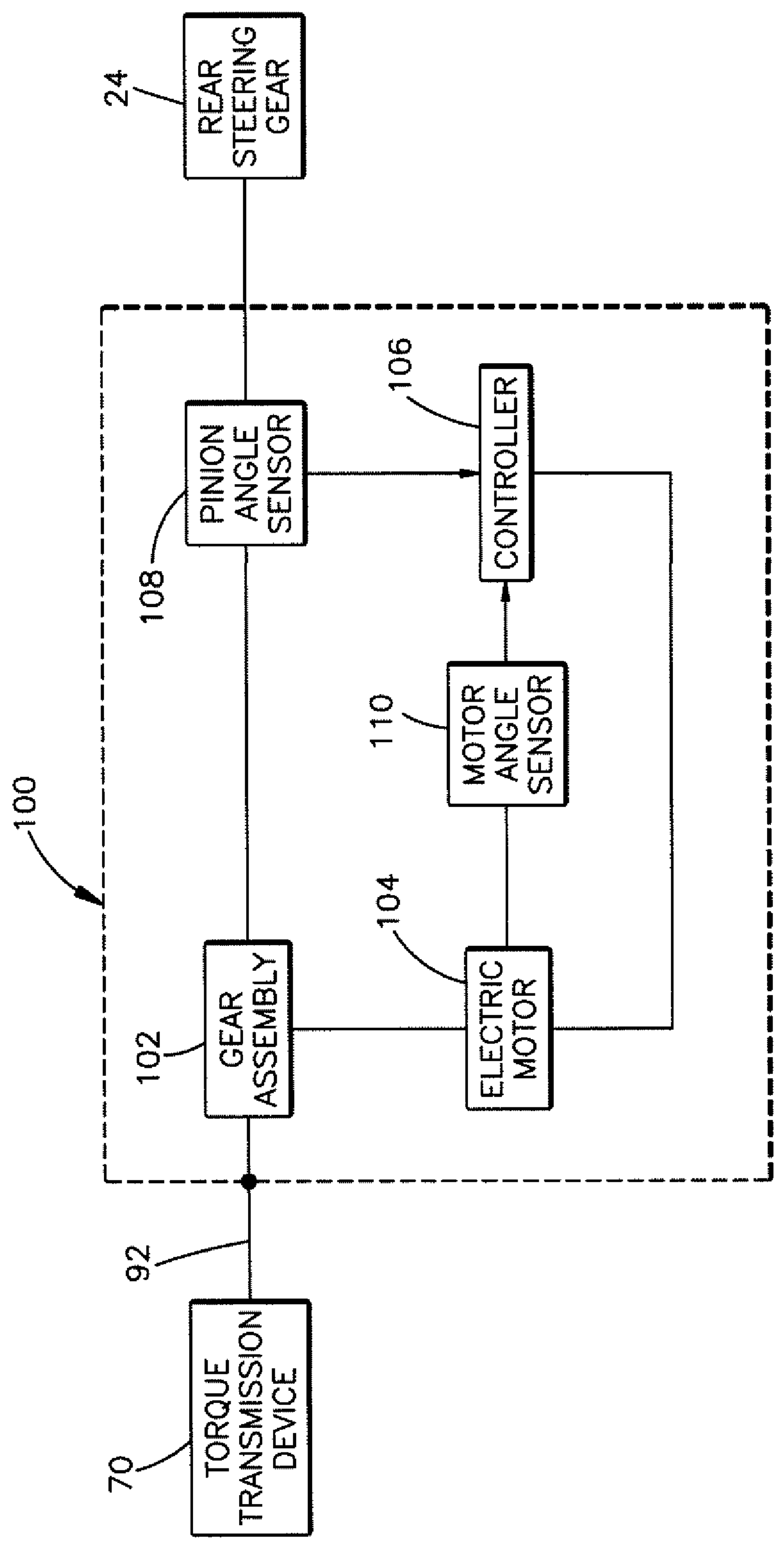
FIG. 4 is a schematic block diagram illustrating an active steering unit of the steering apparatus of FIG. 1.

As shown in FIG. 4, the active steering unit 100 includes a gear assembly 102, e.g., a planetary gear set, that has a first input shaft (not shown) connected to the second output member 92 of the torque transmission device 70 and a second input shaft (not shown). The gearing assembly 102 further includes an output pinion shaft (not shown) connected to the input member (not shown) of the rear steering gear 24. The gear ratio between the output of the gear assembly 102 and the input of the gear assembly may be 1:1 or may be different from 1:1. The active steering unit 100 transfers torque from the second output member 92 of the torque transmission device 70 to the rear steering gear 24. In particular, the active steering unit 100 selectively adjusts the ratio of the torque delivered to the rear steering gear 24 to the torque provided by the second output member 92 of the torque transmission device 70.

The active steering unit 100 also includes an electric motor 104 of any conventional design. The electric motor 104 receives electric power from a power source, e.g., the vehicle battery (not shown). An output shaft (not shown) of the electric motor 104 is connected to the second input shaft of the gear assembly 102. When the electric motor 104 is actuated, the output shaft of the electric motor rotates the second input shaft of the gear assembly 102 to supplement or reduce the torque provided by the second output member 92 of the torque transmission device 70.

The active steering unit 100 further includes a pinion angle sensor 108, a motor angle sensor 110, and a controller 106. Although the controller 106 of the active steering unit 100 is illustrated in FIG. 4 as being separate from the controller 62 of the column drive 50 it will be appreciated that a single controller for both the active steering unit and the column drive may alternatively be used. In any case, each sensor 108, 110 is electrically connected to the controller 106. The pinion angle sensor 108 continuously senses the rotation angle of the output pinion (not shown) of the gear assembly 102 that connects the gear assembly to the input shaft of the rear steering gear 24. The motor angle sensor 110 continuously senses the rotation direction, rotation speed, and/or rotation duration of the electric motor 104. The controller 106 may also be electrically connected to the handwheel rotation sensor 58 and the vehicle speed sensor 60.

The controller 106 receives the signals generated by the handwheel rotation sensor 58, the vehicle speed sensor 60, the pinion angle sensor 108, and the motor angle sensor 110 and analyzes the respective signals in order to generate a signal for controlling the electric motor 104. The controller 106 controls energization, i.e., torque, amount of rotation, and direction of rotation, of the electric motor 104. When the electric motor 104 receives the signal from the controller 106, the output shaft of the electric motor transmits torque to the second input shaft of the gear assembly 102 to affect the torque transmitted to the rear steering gear 24 from the torque transmission device 70.

In operation, when the handwheel 40 is rotated, torque is transferred to the input member 72 of the torque transmission device 70, which transmits torque to the first output member 82 of the torque transmission device (FIG. 1). The first output member 82 transmits the torque to the input member of the front steering gear 22 for actuating the front steering gear in order to assist in steering the front set 14 of the vehicle wheels 14*a*, 14*b*. Simultaneously, the output shaft of the electric motor 52 of the column drive 50 rotates the gear assembly 54 to supplement or reduce the torque from the handwheel 40 based on sensed vehicle conditions to provide feedback or steering feel to the handwheel (FIG. 3).

Rotation of the handwheel 40 also transfers torque to the second output member 92 of the torque transmission device 70. As shown in FIG. 4, the first input shaft of the gear assembly 102 in the active steering unit 100 receives the torque from the second output member 92 of the torque transmission device 70. The second input shaft of the gear assembly 102 simultaneously receives the torque, if any, delivered by the output shaft of the electric motor 104 based on the signals received by the controller 106 from the handwheel rotation sensor 58, the vehicle speed sensor 60, the pinion angle sensor 108, and the motor angle sensor 110.

The active steering unit 100 actuates the electric motor 104 to supply torque to the second input shaft of the gear assembly 102 only when the vehicle is traveling below a predetermined vehicle speed. If the controller 106 determines from the vehicle speed sensor 60 that the vehicle 12 is traveling above a predetermined vehicle speed, i.e., when steering demand is lower, the controller will not generate a signal to actuate the electric motor 104. The electric motor 104 will therefore remain unpowered during steering at higher vehicle speeds. Accordingly, at higher vehicle speeds the gear assembly 102 will only receive a single torque input, i.e., from the second output member 92 of the torque transmission device 70. The gear assembly 102 transfers the single torque input to the input member of the rear steering gear 24 via the output pinion for actuating the rear steering gear. The ratio of the torque delivered to the input member of the steering gear 24 to the torque provided by the second output member 92 may be 1:1 or may be different than 1:1 depending on the configuration of the gear assembly 102.

On the other hand, if the controller 106 determines from the vehicle speed sensor 60 that the vehicle 12 is traveling below a predetermined vehicle speed, i.e., when steering demand is higher, the controller will generate a signal to actuate the electric motor 104 based on the signals received from the handwheel rotation sensor 58, vehicle speed sensor, pinion angle sensor 108, and motor angle sensor 110. Consequently, the gear assembly 102 will receive a torque input from both the second output member 92 of the torque transmission device 70 and the output member of the electric motor 104. The gear assembly 102 transfers the combined torque input to the input member of the rear steering gear 24 via the output pinion shaft in order to actuate the rear steering gear.

In other words, by actuating the electric motor 104 the controller 106 controls the ratio of the torque provided by the second output member 92 of the torque transmission device 70 to the torque delivered to the input shaft of the rear steering gear 24 in a desired manner based on sensed vehicle conditions. Accordingly, the active steering unit 100 is configured to alter the torque delivered to the rear steering gear 24 in order to vary the ratio of the steering assist provided by the front steering gear 22 relative to the steering assist provided by the rear steering gear. Varying the steering assist ratio can be accomplished in real-time to optimize steering assist under various vehicle conditions.

Regardless of whether the electric motor 104 is powered or unpowered, the active steering unit 100 is configured to ensure that there is always a mechanical connection between the handwheel 40 and the rear steering gear 24. More specifically, the gear assembly 102 of the active steering unit 100 is always mechanically connected to both the torque transmission device 70 and the rear steering gear 24. The continuous mechanical connection between the handwheel 40 and the rear steering gear 24 helps to ensure that the rear steering gear remains operable if a portion of the active steering unit 100 fails.

Referring to FIG. 1, each anti-lash unit 130 is configured to reduce or remove relative movement between components of the steering apparatus 10 that result due to manufacturing tolerances, wear, and/or other causes. The anti-lash unit 130 associated with the front steering gear 22 is configured to bias the first set 14 of steerable wheels 14*a*, 14*b* in a first direction relative to the vehicle frame. Likewise, the anti-lash unit 130 associated with the rear steering gear 24 is configured to bias the second set 16 of steerable wheels 16*a*, 16*b* in a second direction relative to the vehicle frame. The first biasing direction may be identical to or different from, e.g., opposite, the second biasing direction. The anti-lash units 130 may use biasing members such as springs 132 acting between the frame of the vehicle 12 and the sets 14, 16 of steerable wheels 14*a*, 14*b*, 16*a*, 16*b* and/or the steering linkages 36, 38 in order to bias the steerable vehicle wheels in the desired manner. The anti-lash units 130 may function independent of one another or may act together through the entire steering apparatus 10 in order to remove lash from the steering apparatus.

Although the steering apparatus 10 of the present invention is illustrated and described as including a particular active steering unit 100 those having ordinary skill in the art will appreciate that the active steering unit may have a different configuration or may be omitted entirely.

From the above description of the invention, those skilled in the art will perceive improvements, changes and modifications. Such improvements, changes and modifications within the skill of the art are intended to be covered by the appended claims.

Having described the invention, the following is claimed:

1. A steering apparatus responsive to rotation of a handwheel for turning steerable wheels of a vehicle having first and second sets of steerable wheels, the steering apparatus comprising:

a first steering gear actuatable to affect turning of the first set of steerable wheels in response to rotation of the handwheel;

a second steering gear actuatable to affect turning of the second set of steerable wheels in response to rotation of the handwheel;

a torque transmission device comprising:

an input member connected to the handwheel and rotatable in response to rotation of the handwheel;

a first output member mechanically coupled to the input member and connected to the first steering gear for actuating the first steering gear; and a second output member mechanically coupled to the input member and connected to the second steering gear for actuating the second steering gear;

a sensor for sensing at least one condition of the handwheel and for providing a steering signal indicative of the at least one sensed handwheel condition; and a controller for receiving the steering signal and for, in response to the steering signal, controlling rotation of the input member of the torque transmission device for controlling actuation of the first and second steering gears.

2. The steering apparatus of claim 1 further comprising:

a gear assembly connected to the input member of the torque transmission device; and an electric motor having an output connected to the gear assembly, the output of the electric motor being rotatable to affect rotation of the input member.

3. The steering apparatus of claim 1, wherein the input member of the torque transmission device includes a first gear, the first output member includes a second gear, and the second output member includes a third gear, the first gear being in meshing engagement with the second gear and the third gear in order to simultaneously affect rotation of the second gear and the third gear for actuating the first and second steering gears.

4. The steering apparatus of claim 1 further comprising an electric motor coupled to the input member of the torque transmission device, the controller, in response to the steering signal, applying electric power to the electric motor to affect rotation of the input member, thereby rotating the first output member and the second output member of the torque transmission device for actuating the first and second steering gears.

5. The steering apparatus of claim 4, wherein an output of the electric motor is connected to a gear assembly and the gear assembly is connected to the input member of the torque transmission device, the output of the electric motor being rotated to affect rotation of the input member.

6. The steering apparatus of claim 1, wherein the input member and the first output member have a gear ratio that is different than a gear ratio between the input member and the second output member.

7. The steering apparatus of claim 1 further comprising an active steering unit for, in response to at least one sensed vehicle condition, selectively controlling the ratio of the rotation of the second output member to the rotation of an input member of the second steering gear for controlling actuation of the second steering gear.

8. The steering apparatus of claim 7, wherein the at least one sensed vehicle condition includes vehicle speed.

9. The steering apparatus of claim 8, wherein the active steering unit includes:

a gear system connected to the second output member and the input member of the second steering gear; and an electric motor connected to the gear system, the gear system simultaneously transmitting rotation of the second output member and rotation of the electric motor to the input member of the second steering gear for controlling actuation of the second steering gear.

10. The steering apparatus of claim 9, wherein the electric motor rotates only when the sensed vehicle speed is below a predetermined amount.

11. The steering apparatus of claim 9, wherein the active steering unit further includes:

an active steering controller;

a sensor for sensing the rotation angle of an output shaft of the gear system and providing a signal indicative of the sensed output shaft rotation angle; and a sensor for sensing at least one of the direction, speed, and duration of rotation of the electric motor and providing a signal indicative of the sensed electric motor rotation, the active steering controller, in response to the sensed output shaft rotation signal and the sensed electric motor rotation signal, controlling the rotation of the electric motor to control the ratio of the rotation of the second output member to the rotation of the input member of the second steering gear.

12. The steering apparatus of claim 11, wherein the active steering controller, in response to the sensed handwheel rotation signal, controls rotation of the electric motor to control the ratio of the rotation of the second output member to the rotation of the input member of the second steering gear.

13. The steering apparatus of claim 1, wherein the first output member is connected to an input member of the first steering gear and the second output member is connected to an input member of the second steering gear.

14. The steering apparatus of claim 1 further including:

a first anti-lash unit for biasing the first set of steerable wheels in a first direction relative to a frame of the vehicle; and a second anti-lash unit for biasing the second set of steerable wheels in a second direction relative to the frame of the vehicle.

15. The steering apparatus of claim 14, wherein the first direction and the second direction extend opposite to one another.

16. The steering apparatus of claim 1 further including:

a vehicle speed sensor; and an active steering unit electrically connected to the vehicle speed sensor, the active steering unit supplementing torque provided by the second output member to the second steering gear only when the vehicle speed is below a predetermined amount such that different torques are applied to the first steering gear and the second steering gear.

17. A steering apparatus responsive to rotation of a handwheel for turning steerable wheels of a vehicle having first and second sets of steerable wheels, the steering apparatus comprising:

a first steering gear actuatable to affect turning of the first set of steerable wheels in response to rotation of the handwheel;

a second steering gear actuatable to affect turning of the second set of steerable wheels in response to rotation of the handwheel;

a torque transmission device comprising:

an input member connected to the handwheel and rotatable in response to rotation of the handwheel;

a first output member mechanically coupled to the input member and connected to the first steering gear for actuating the first steering gear; and a second output member mechanically coupled to the input member and connected to the second steering gear for actuating the second steering gear;

a sensor for sensing at least one condition of the handwheel and for providing a steering signal indicative of the at least one sensed handwheel condition; and a controller for receiving the steering signal and for, in response to the steering signal, providing feedback to the handwheel.

* * * * *